US012756140B2

(12) United States Patent
Rupert

(10) Patent No.: US 12,756,140 B2
(45) Date of Patent: Oct. 6, 2026

(54) LATCHING ARRANGEMENT FOR MATING ELECTRICAL MODULES

(71) Applicant: Group Dekko, Inc., Fort Wayne, IN (US)

(72) Inventor: Brian K. Rupert, Kendallville, IN (US)

(73) Assignee: Group Dekko, Inc., Fort Wayne, IN (US)

( * ) Notice: Subject to any disclaimer, the term of this patent is extended or adjusted under 35 U.S.C. 154(b) by 344 days.

(21) Appl. No.: 17/803,197

(22) Filed: Apr. 9, 2024

(65) Prior Publication Data

US 2025/0316927 A1 Oct. 9, 2025

(51) Int. Cl.

| | |
|---|---|
| ***H01R 13/627*** | (2006.01) |
| ***H01R 24/78*** | (2011.01) |
| ***H01R 25/00*** | (2006.01) |
| ***H01R 105/00*** | (2006.01) |
| ***H02G 3/38*** | (2006.01) |

(52) U.S. Cl.

CPC ......... *H01R 13/6273* (2013.01); *H01R 24/78* (2013.01); *H01R 25/006* (2013.01); *H02G 3/288* (2013.01); *H01R 2105/00* (2013.01)

(58) Field of Classification Search

CPC .. H01R 13/6273; H01R 24/78; H01R 25/006; H01R 2105/00; H02G 3/288

USPC ......................... 439/120, 215, 216, 115, 121

See application file for complete search history.

(56) References Cited

U.S. PATENT DOCUMENTS

| | | | |
|---|---|---|---|
| 4,551,577 | A | 11/1985 | Bryne |
| 4,959,021 | A | 9/1990 | Byrne |
| 5,087,207 | A | 2/1992 | Byrne |
| 5,096,431 | A | 3/1992 | Byrne |
| 5,096,434 | A | 3/1992 | Byrne |
| 5,171,159 | A | 12/1992 | Byrne |
| 5,259,787 | A | 11/1993 | Byrne |
| 5,941,720 | A | 8/1999 | Byrne |
| 6,027,352 | A | 2/2000 | Byrne |
| 6,036,517 | A | 3/2000 | Byrne |
| 6,406,314 | B1 | 6/2002 | Byrne |
| 6,575,777 | B2 | 6/2003 | Henriott et al. |
| 6,835,081 | B2 | 12/2004 | Plattner et al. |
| 6,991,485 | B2 | 1/2006 | Plattner et al. |

(Continued)

*Primary Examiner* — Gary F Paumen

(74) *Attorney, Agent, or Firm* — TAYLOR & EDELSTEIN, PC

(57) ABSTRACT

An electrified office furniture system includes: a piece of office furniture; and an electrical distribution system associated with the piece of office furniture, the electrical distribution system including: a first electrical module including a first electrical module latching arrangement which includes a first pair of female latch members and a first pair of male latch members; and a second electrical module including a second electrical module latching arrangement which includes a first pair of female latch members and a first pair of male latch members, the first pair of female latch members of the first electrical module latching arrangement and the first pair of male latch members of the first electrical module latching arrangement being selectively and releasably coupled with the first pair of male latch members of the second electrical module latching arrangement and the first pair of female latch members of the second electrical module latching arrangement respectively.

20 Claims, 9 Drawing Sheets

(56) References Cited

U.S. PATENT DOCUMENTS

| | | | | |
|---|---|---|---|---|
| 7,410,379 | B1 * | 8/2008 | Byrne | H01R 13/652 439/53 |
| 7,465,178 | B2 | 12/2008 | Byrne | |
| 7,494,356 | B2 | 2/2009 | Byrne | |
| 7,585,180 | B2 | 9/2009 | Riner et al. | |
| 7,688,564 | B2 | 3/2010 | Byrne | |
| 7,690,934 | B2 | 4/2010 | Riner | |
| 7,699,631 | B2 | 4/2010 | Knepper | |
| 7,926,231 | B2 | 4/2011 | Laukuf | |
| 8,444,425 | B2 | 5/2013 | Byrne | |
| 8,496,492 | B2 * | 7/2013 | Byrne | H01R 25/16 439/210 |
| 8,736,106 | B2 * | 5/2014 | Byrne | H01R 31/02 174/59 |
| 9,048,598 | B2 | 6/2015 | Byrne et al. | |
| 9,166,308 | B2 | 10/2015 | Byrne | |
| 9,438,023 | B2 | 9/2016 | Ty et al. | |
| 10,218,135 | B2 | 2/2019 | Byrne | |
| 10,910,780 | B2 | 2/2021 | Byrne | |
| 11,527,875 | B2 | 12/2022 | Riner | |
| 2007/0259548 | A1 | 11/2007 | Byrne | |
| 2009/0239402 | A1 * | 9/2009 | Byrne | H01R 9/22 439/215 |
| 2019/0386441 | A1 | 12/2019 | Byrne | |

* cited by examiner

LATCHING ARRANGEMENT FOR MATING ELECTRICAL MODULES

BACKGROUND OF THE INVENTION

1. Field of the Invention

The present invention relates to electrified furniture systems, and, more particularly, to electrical modules of the electrified furniture systems.

2. Description of the Related Art

Furniture includes office furniture, such as wall panels (such as modular wall panels), tables, benches, desks, shelves, or the like. At least certain types of office furniture can be associated with electrical distribution systems, so as to carry electricity to desired locations.

Modular wall panels have been used for a number of years to divide a relatively large open space into smaller cubicles or workspaces and have the advantage of being comparatively easily rearranged. Electrification of those wall panels was one of the early improvements. Many techniques for power or communications wiring in modular furniture are known. Wall panels and other modular components may have raceways for enclosing the wiring which may be installed on site as the panels are being assembled, or which may be factory installed to be later interconnected by panel-to-panel interconnects or jumpers. The electrification of such wall panels may thus be accomplished by an electrical distribution system.

Generally, such an electrical distribution system may include multiple channel electrical distribution harnesses (which can also be referred to as an electrical distribution harness assembly or an electrical distribution harness), electrical cables, e.g. jumper cables (which can also be referred to as jumper devices, jumper assemblies, or jumpers), which interconnect the electrical distribution harnesses together, and electrical receptacles. Each electrical distribution harness may mount multiple inlet connection points for receiving the jumpers and electrical receptacle connection points for receiving the electrical receptacles. Each electrical distribution harness may distribute electrical power from the jumpers to the electrical receptacles. The electrical distribution system is typically mounted internally within a structure, such as a wall (such as the aforementioned modular wall panels) or a series of desks.

The wall panels, for instance, that accommodate the electrical distribution system must be wide enough to accommodate the electrical distribution system. The width of such wall panels are already minimized. Thus, a problem arises when a thinner wall panel is desired, such as a one-inch thick wall panel.

Known is a jumper that includes a latching arrangement including a pair of connector tabs. Such a jumper may be attached to a receptacle junction block for instance using these connector tabs, which are received respectively by a pair of tab slots of the receptacle junction block. One problem with such a design is that a distal end of the connector tab is exposed externally relative to the receptacle junction block, which could facilitate an unlocking of the connector tab from the tab slot if the connector tab is inadvertently pushed.

What is needed in the art is an improved latching arrangement for electrical modules.

SUMMARY OF THE INVENTION

The present invention provides an electrical module with a latching arrangement including both a pair of male latch members and a pair of female latch members for secure and releasable attachment to another electrical module.

The invention in one form is directed to an electrified office furniture system, which includes: at least one piece of office furniture; and an electrical distribution system associated with the at least one piece of office furniture, the electrical distribution system including: a first electrical module including a first electrical module latching arrangement which includes a first pair of female latch members and a first pair of male latch members; and a second electrical module including a second electrical module latching arrangement which includes a first pair of female latch members and a first pair of male latch members, the first pair of female latch members of the first electrical module latching arrangement and the first pair of male latch members of the first electrical module latching arrangement being selectively and releasably coupled with the first pair of male latch members of the second electrical module latching arrangement and the first pair of female latch members of the second electrical module latching arrangement respectively.

The invention in another form is directed to an electrical distribution system for an electrified office furniture system, the electrified office furniture system including at least one piece of office furniture, the electrical distribution system being associated with the at least one piece of office furniture, the electrical distribution system including: a first electrical module including a first electrical module latching arrangement which includes a first pair of female latch members and a first pair of male latch member, the first pair of female latch members of the first electrical module latching arrangement and the first pair of male latch members of the first electrical module latching arrangement being configured for being selectively and releasably coupled with a first pair of male latch members of a second electrical module latching arrangement of a second electrical module and a first pair of female latch members of the second electrical module latching arrangement respectively.

The invention in yet another form is directed to a method of using an electrified office furniture system, the method including the steps of: providing that the electrified office furniture system includes at least one piece of office furniture and an electrical distribution system which is associated with the at least one piece of office furniture, the electrical distribution system including a first electrical module and a second electrical module, the first electrical module including a first electrical module latching arrangement which includes a first pair of female latch members and a first pair of male latch members, the second electrical module including a second electrical module latching arrangement which includes a first pair of female latch members and a first pair of male latch members; and coupling, selectively and releasably, the first pair of female latch members of the first electrical module latching arrangement and the first pair of male latch members of the first electrical module latching arrangement with the first pair of male latch members of the second electrical module latching arrangement and the first pair of female latch members of the second electrical module latching arrangement respectively.

An advantage of the present invention is that it provides for secure attachment of one electrical module to another electrical module.

Another advantage of the present invention is that it allows for various different types of electrical modules to securely and releasably connect with one another, such as, a receptacle to a receptacle, a receptacle to a jumper, or a jumper to a jumper. Thus, the present invention provides an electrical distribution system that does not require an electrical distribution harness to which electrical receptacles and jumpers are attached. Electrical receptacles and jumpers can be connected directly to one another, for instance by way of hermaphroditic electrical connectors of the electrical receptacles and jumpers.

Yet another advantage of the present invention is that electrical modules can be used with one-inch thick wall panels or other relatively thin (i.e., one-inch thick) raceways or channels.

Yet another advantage of the present invention is that the electrified office furniture system can include various types of pieces of office furniture, such as wall panels (such as modular wall panels), tables, benches, desks, shelves, or the like.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
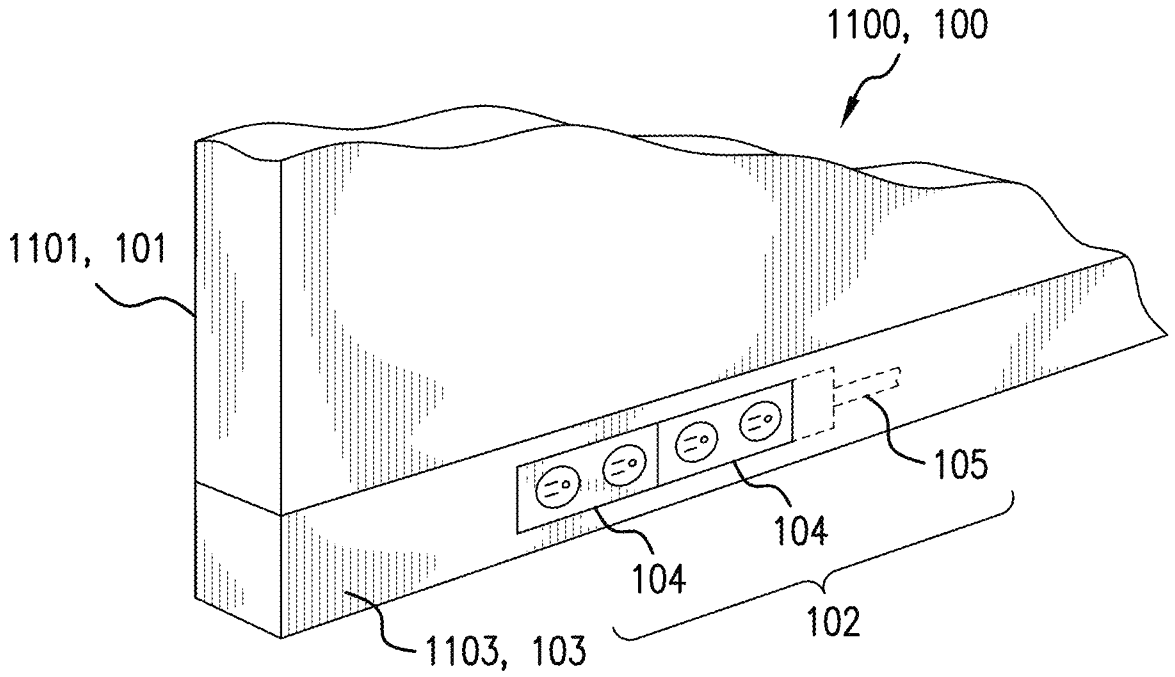
FIG. 1 is a perspective view of an electrified office furniture system including a wall panel and an electrical distribution system, according to an exemplary embodiment of the present invention.

Referring now to the drawings, and more particular to FIG. 1, there is shown an electrified office furniture system 1100, which includes at least one piece of office furniture 1101 and an electrical distribution system 102 associated with the at least one piece of office furniture 1101. The reference number 1100 generally refers to an electrical distribution system of various embodiments, and the reference number 1101 generally refers to a piece of office furniture of various embodiments. Thus, office furniture 1101 generally refers to any sort of office furniture, which can be used to make a space suitable for working, though such office furniture 1101 need not be in an office but can be located in any location employing electricity. For example (and not limitation), office furniture 1101 can be, for example (and not limitation), wall panels (such as modular wall panels 101), tables, benches, desks, cabinets, shelves, raceways (though not part of a wall panel), or the like. Office furniture 1101, in FIG. 1, is shown according to one exemplary embodiment of the present invention to be a modular wall panel 101; thus, electrified office furniture system 1100, in FIG. 1, is shown according to one exemplary embodiment of the present invention to be an electrified wall panel system 100. Though electrified office furniture system 1100 is shown to be an electrified wall panel system 100 according to one embodiment of the present invention, electrified office furniture system 1100 is not limited to being an electrified wall panel system 100, as indicated by the notion that office furniture 1101 can be not only wall panel 101 but other types of office furniture 1101, as indicated above. Further, electrical distribution system 102 is associated with office furniture 1101 in any suitable manner. For instance, electrical distribution system 102 can be positioned on or in (in whole or in part) office furniture 1101 and can be coupled with office furniture 1101 in any suitable manner. For example, the at least one piece of office furniture 1101 can include an elongate distribution arrangement 1103 (the reference number 1103 generally refers to an elongate distribution arrangement of various embodiments), the electrical distribution system 102 being associated with elongate distribution arrangement 1103 and optionally being coupled with elongate distribution arrangement 1103. Thus, in the embodiment shown and described herein, office furniture 1101 is shown as modular wall panel 101, which can be a plurality of modular wall panels 101 which are placed in an end-to-end fashion relative to each other in an office or other commercial or home office setting. Each wall panel 101 generally includes elongate distribution arrangement 103 in the form a raceway 103 that is an elongate hollow opening extending across the width of panel 101 at a convenient location, which line up with each other in an end-to-end manner from panel 101 to panel 101. For example, as indicated, raceways 103 could be formed as a number of beltline raceways which line up with each other in an end-to-end manner from panel to panel, or could be raceways 103 formed at or near the bottom of panels 101 which line up with each other in an end-to-end manner from panel to panel. As another example, as indicated, the office furniture 1101 could be a desk or a table, and the elongate distribution arrangement 1103 could be a distribution channel formed in the desk or table. As yet another example, the elongate distribution arrangement 1103 could be in the form of an elongate channel with a generally U-shaped cross section which is attached to the bottom of the desk or table. Thus, each said elongate distribution arrangement 1103 can, for example and not limitation, include: a beltline raceway in an office wall panel; a bottom raceway 103 in an office wall panel 101; a distribution channel formed in a desk or table; or a distribution channel attached to the bottom of a desk or table.

FIG. 1 thus shows panel system 100, which can, according to an exemplary embodiment of the present invention, be a modular wall panel system used in an office space to partition an open floor plan environment by way of partitioning walls. Panel system 100 includes wall panel 101 (for example, a modular wall panel used as such a partitioning wall) and an electrical distribution system 102 coupled in any suitable manner with wall panel 101. Wall panel 101 includes a raceway 103, electrical distribution system 102 being coupled with raceway 103. Wall panel 101 can be a wall of any height and/or distance from the ceiling; for example, wall panel 101 may extend from floor to ceiling, or at any intermediate height therebetween. Further, depending upon the height of wall panel 101, raceway 103 may be positioned at any height within wall panel, for example, at the bottom of wall panel 101 (as in FIG. 1), at the top of wall panel 101, or at a beltline of wall panel 101. Further, wall panel 101 may alternatively be positioned at any select height above the floor and at any select distance from the ceiling.

Electrical distribution system 102 can be at least partially positioned within raceway 103 and can include electrical power distribution elements and/or data distribution elements. Electrical distribution system 102, in FIG. 1, is shown to include two electrical receptacles 104 (shown schematically and connected to one another mechanically and electrically) and a jumper assembly 105 (which can also be referred to as a jumper or a jumper device, is shown schematically, and is shown in broken lines because jumper 105 is placed in raceway 103). Here, receptacles 104 can be entirely positioned within raceway 103, or can be partially enclosed within raceway 103, and can partially extend outside of raceway 103. Receptacles 104 are coupled with and at least partially enclosed within raceway 103, and jumper 105 is coupled with and at least partially enclosed within raceway 103. The combination of elements 104, 105 shown in FIG. 1 are shown merely by way of example and not limitation. Other combinations can be used instead, for example, a single receptacle 104, or receptacles 104 facing in opposite directions rather than in the same direction as shown in FIG. 1, or jumpers 105 connected to one another. Electrical distribution system 102 can be any suitable system; by way of example and not limitation, electrical distribution system 102 can be a multi-circuit (such as a two-wire circuit), four wire system. Receptacles 104 and jumper 105 are positioned within raceway 103.

Figure 2:
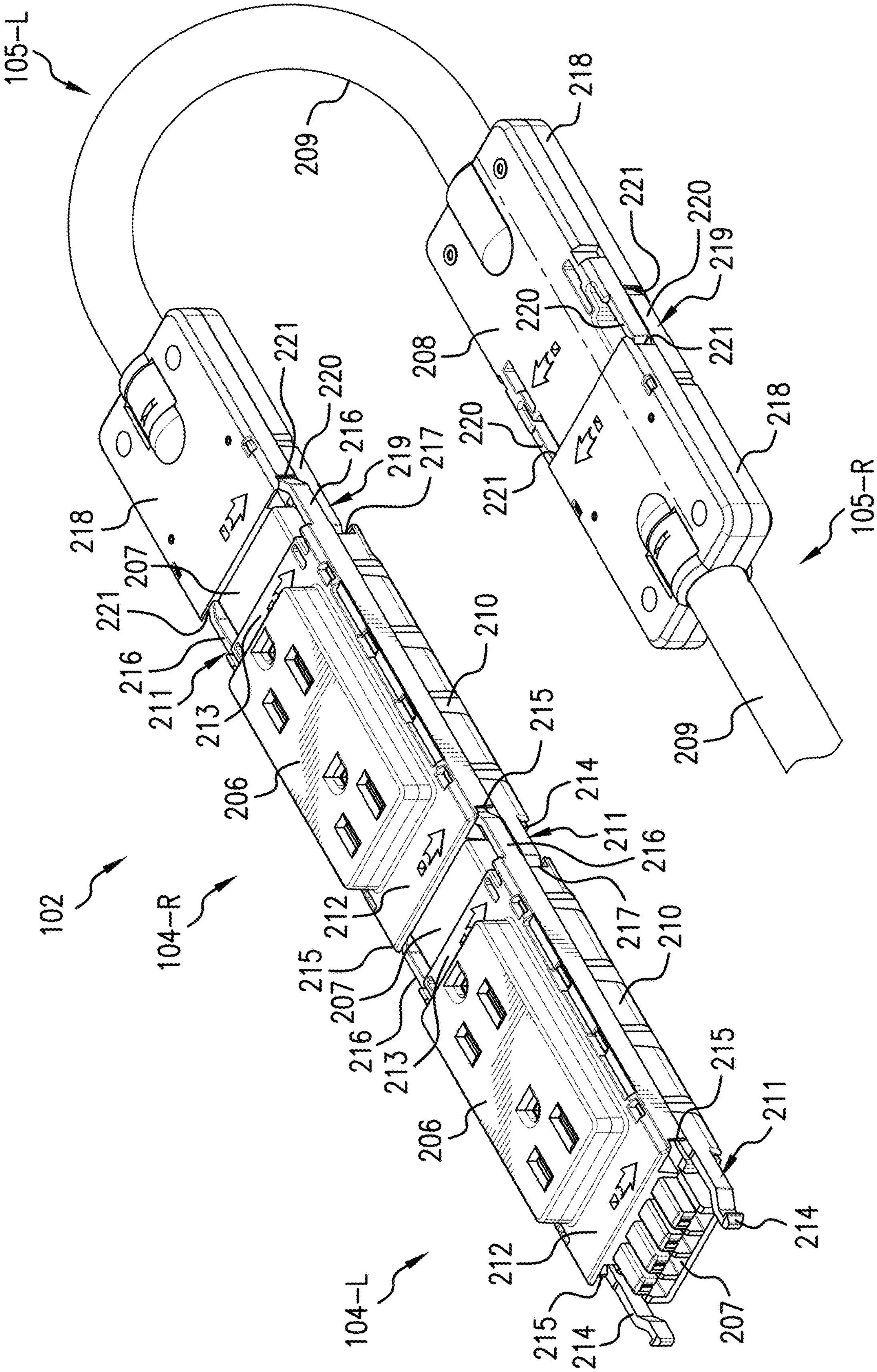
FIG. 2 is a perspective view of the electrical distribution system of FIG. 1, according to an exemplary embodiment of the present invention.

Referring now to FIG. 2, there is shown a perspective view of an embodiment of electrical distribution system 102, which is consistent with what is shown in FIG. 1, according to an exemplary embodiment of the present invention. System 102 includes two receptacles 104-L, 104-R joined directly to one another, jumper assembly 105-L connected directly to receptacle 104-R, and another jumper assembly 105-R connected directly to jumper assembly 105-L. Proceeding from left to right in FIG. 2, receptacle 104-L is the left receptacle, 104-R is the right receptacle, jumper 105-L is the left jumper assembly, and jumper 105-R is the right jumper assembly. Receptacles 104-L, 104-R are substantially identical to one another. Receptacle 104-L is the same as the left receptacle 104 in FIG. 1, receptacle 104-R is the same as the right receptacle 104 in FIG. 1, and jumper 105-L is the same as jumper 105 in FIG. 1. Receptacles 104-L, 104-R and jumpers 105-L, 105-R each are electrical modules. Each receptacle 104-L, 104-R includes an outlet face 206, to which a three-pronged electrical plug can be directly connected. Here, outlet faces 206 of receptacles 104-L, 104-R are shown to point in the same direction. However, alternatively, receptacles 104-L, 104-R can be directly connected to one another in such a way that outlet faces 206 point in opposite directions relative to one another (which is explained further below). Receptacles 104-L, 104-R each includes electrical connectors 207 at opposing ends of respective receptacles 104-L, 104-R. Respective electrical connectors 207 of receptacles 104-L, 104-R are shown in FIG. 2 to be connected directly to one another. Jumper 105-L includes opposing electrical connectors 208 and conduit 209 joining electrical connectors 208. A respective electrical connector 207 of receptacle 104-R is directly connected with electrical connector 208 of jumper 105-L. Jumper 105-R also includes electrical connector 208 and conduit 209 connected thereto (according to an exemplary embodiment of jumper 105-R, jumper 105-R is substantially identical to jumper 105-L, though alternatively jumper 105-R may omit a body 218 and an electrical connector 208 on the end of conduit 209 that is broken away and thus not visible in FIG. 2). Electrical connector 208 of jumper 105-R is directly connected to electrical connector 208 of jumper 105-L. Jumpers 105-L, 105-R are shown to include conduit 209, which are shown schematically in FIGS. 2, 3, 4, and 5 but which are shown in FIG. 6, according to an exemplary embodiment of conduit 209, to have a round flexible body; according to an alternative embodiment of the jumper assembly, the jumper assembly can include a conduit that has a flexible mesh body that has a generally flat cross-section, such that the jumper assembly is a mesh jumper. Because each of electrical connectors 207, 208 are hermaphroditic and substantially identical to one another, electrical connectors 207 can directly connect with other electrical connectors 207, electrical connectors 208 can directly connect with other electrical connectors 208, and electrical connectors 207 and 208 can directly connect with one another.

Further, each receptacle 104-L, 104-R includes a body 210, a first end 212, a second end 213 opposing first end 212, and a latching arrangement 211. Body 210 at least partly includes electrical connectors 207, which include ports defined by body 210 and respective ends of electrical terminals housed within body 210. Latching arrangement 211 of receptacle 104-L, 104-R includes a first pair of male latch members 214, a first pair of female latch members 215, a second pair of male latch members 216, a second pair of female latch members 217, first end 212 including the first pair of male latch members 214 and the first pair of female latch members 215, second end 213 including the second pair of male latch members 216 and the second pair of female latch members 217. Further, each jumper 105-L, 105-R includes a body 218 and a latching arrangement 219. Body 218 at least partly includes electrical connectors 208, which include ports defined by body 218 and respective ends of electrical terminals housed within body 218. Latching arrangement 219 of jumpers 105-L, 105-R includes a pair of male latch members 220 and a pair of female latch members 221. According to an embodiment of the present invention, male latch members 214, 216, 220 are substantially similar to one another, and female latch members 215, 217, 221 are substantially similar to one another. Body 210 of each receptacle 104-L, 104-R defines female latch members 215, 217, and each body 218 of jumpers 105-L, 105-R defines female latch members 221.

Latching arrangements 211, 219 are configured for releasably securing receptacles 104-L, 104-R with one another, receptacles 104-R and jumpers 105-L with one another, and jumpers 105-L, 105-R with one another. As shown in FIG. 2, the second pair of female latch members 217 of second end 213 of receptacle 104-L and the second pair of male latch members 216 of second end 213 of receptacle 104-L are selectively and releasably coupled with the first pair of male latch members 214 of first end 212 of receptacle 104-R and the first pair of female latch members 215 of first end 212 of receptacle 104-R respectively. Further, the second pair of male latch members 216 of second end 213 of receptacle 104-R and the second pair of female latch members 217 of second end 213 of receptacle 104-R are selectively and releasably coupled with the pair of female latch members 221 of one end of jumper 105-L and the pair of male latch members 220 of one end of jumper 105-L respectively. Further, the pair of male latch members 220 of the opposing end of jumper 105-L and the pair of female latch members 221 the opposing end of jumper 105-L are selectively and releasably coupled with the pair of female latch members 221 of one end of jumper 105-R and the pair of male latch members 220 of one end of jumper 105-R respectively. Female latch members 215, 217, 221 receive male latch members 214, 216, 220 and releasably latch thereto (as explained further below).

Further, though not shown, according to an alternative embodiment of the present invention, body 210 of receptacles 104-L, 104-R can include screw tabs on longitudinally extending sides of receptacles 104-L, 104-R. Fasteners, such as screws, can be inserted through holes in such screw tabs so as to secure (directly or indirectly) receptacles 104-L, 104-R to a respective wall panel 101, for example.

Figure 3:
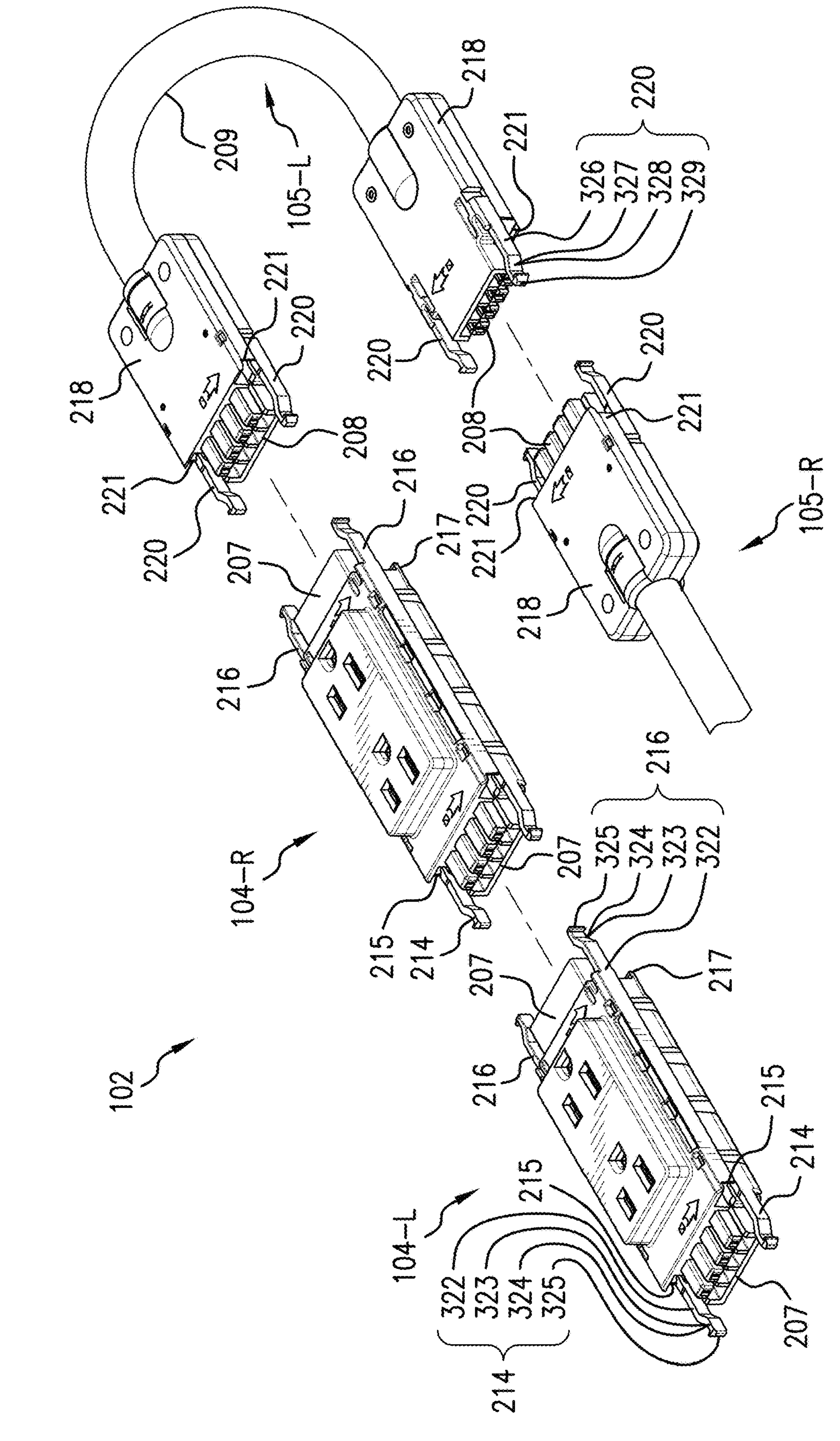
FIG. 3 is an exploded perspective view of the electrical distribution system of FIG. 2, according to an exemplary embodiment of the present invention.

Referring now to FIG. 3, there is shown an exploded perspective view of electrical distribution system 102 shown in FIG. 2. Each male latch member 214, 216 of receptacles 104-L, 104-R includes a proximal portion 322 and a distal portion 323, proximal portion 322 extending from body 210 as a cantilevered beam 322, distal portion 323 extending from proximal portion 322 as a hook 324, which includes a barb 325. Similarly, each male latch member 220 of jumpers 105-L, 105-R includes a proximal portion 326 and a distal portion 327, proximal portion 326 extending from body 218 as a cantilevered beam 326, distal portion 327 extending from proximal portion 326 as a hook 328, which includes a barb 329.

Figure 4:
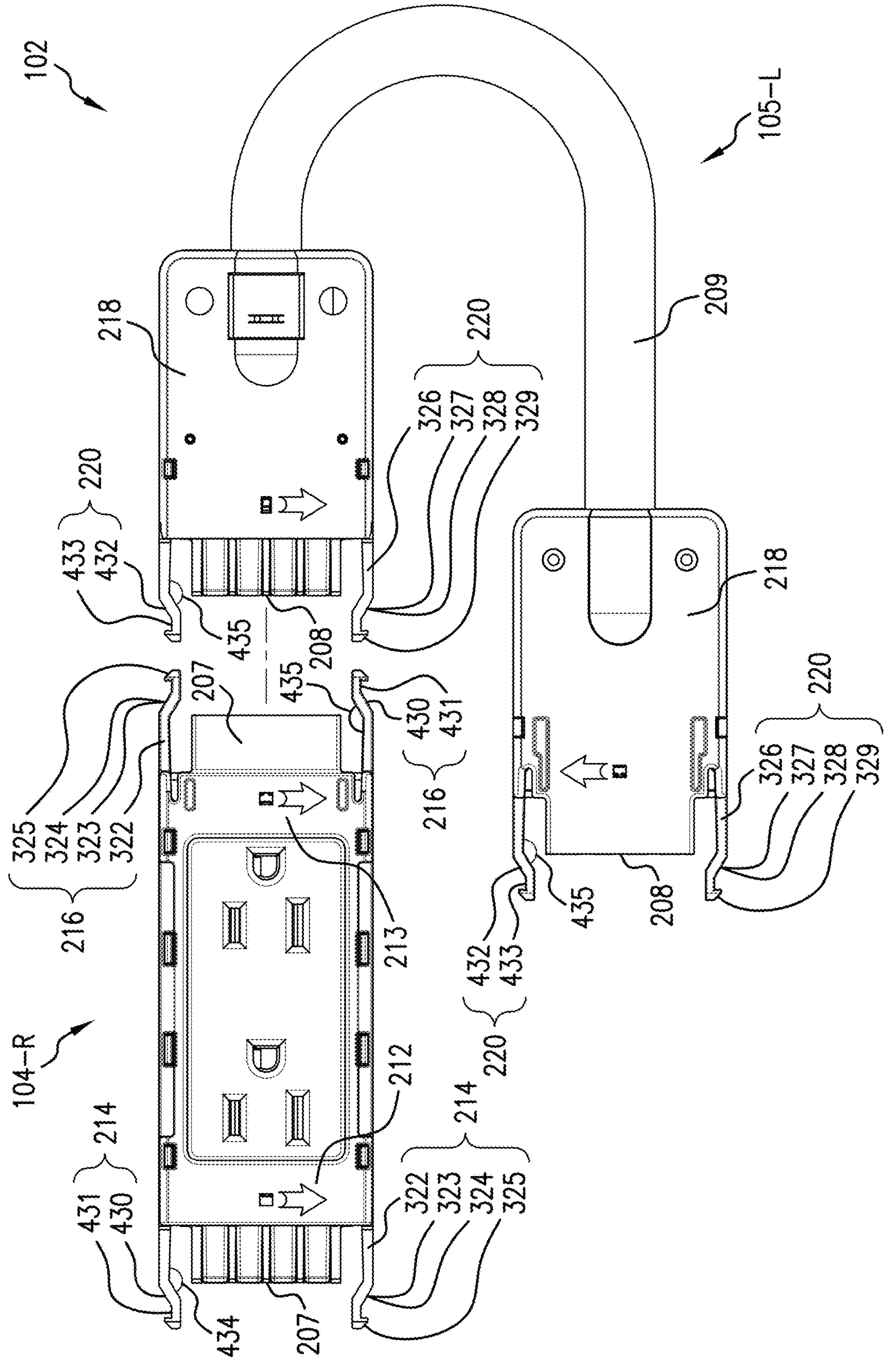
FIG. 4 is an exploded side view of the electrical distribution system of FIG. 2, with portions broken away, according to an exemplary embodiment of the present invention.

Referring now to FIG. 4, there is shown an exploded side view of electrical distribution system 102, with portions broken away. More specifically, FIG. 4 shows receptacle 104-R and jumper 105-L. Regarding each of male latch members 214, 216 of receptacles 104-L, 104-R, hook 324 includes a first leg 430 attached to cantilevered beam 322, a second leg 431 attached to first leg 430 and to barb 325. First leg 430 forms an obtuse angle 434 with cantilevered beam 322 and thereby offsets first leg 430 inwardly relative to cantilevered beam 322, second leg 431 being parallel to cantilevered beam 322. Further, regarding male latch member 220 of jumpers 105-L, 105-R, hook 328 includes a first leg 432 attached to cantilevered beam 326, a second leg 433 attached to first leg 432 and to barb 329. First leg 432 forms an obtuse angle 435 with cantilevered beam 326 and thereby offsets first leg 432 inwardly relative to cantilevered beam 326, second leg 433 being parallel to cantilevered beam 326.

Figure 5:
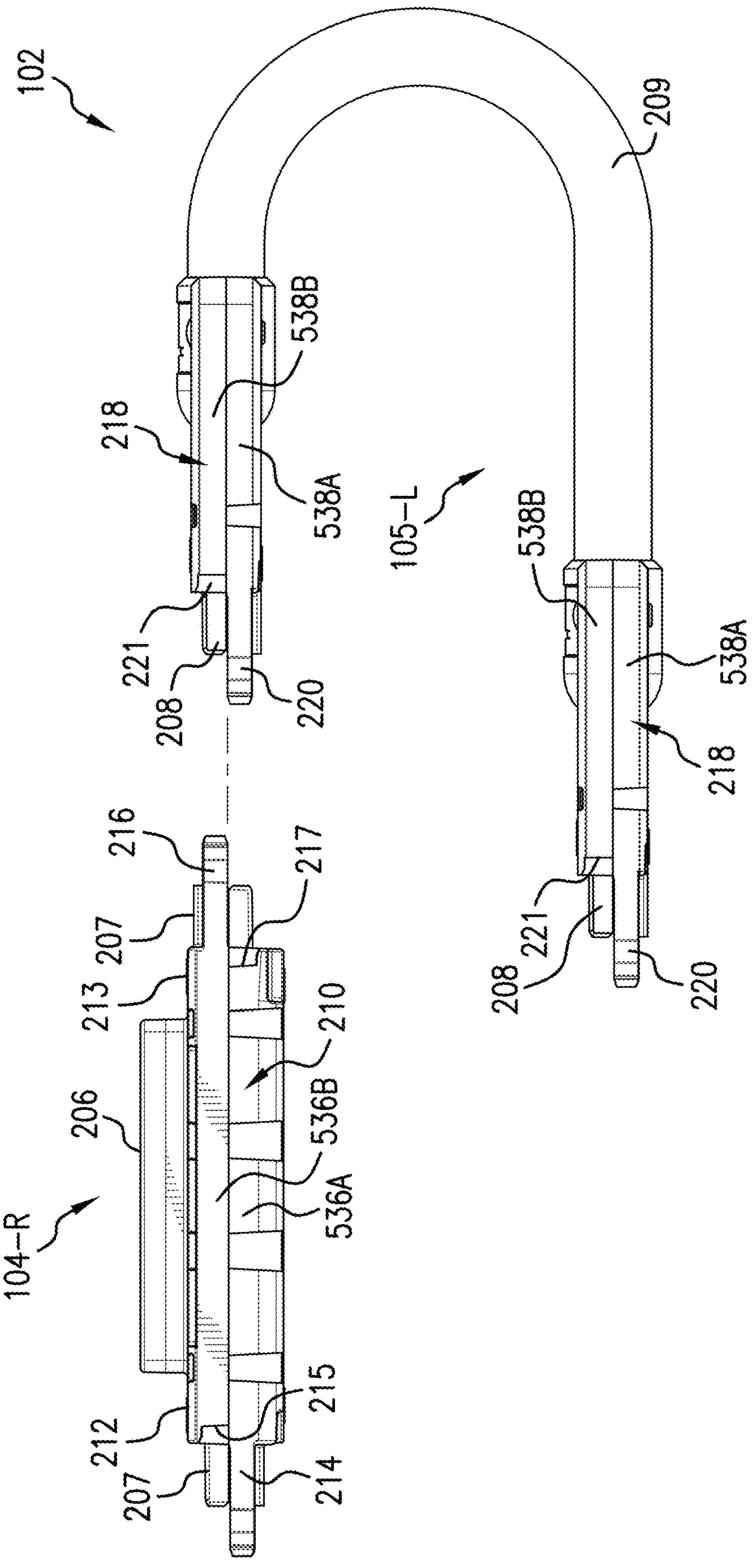
FIG. 5 is another exploded side view of the electrical distribution system of FIG. 2, with portions broken away, according to an exemplary embodiment of the present invention.
Figure 6:
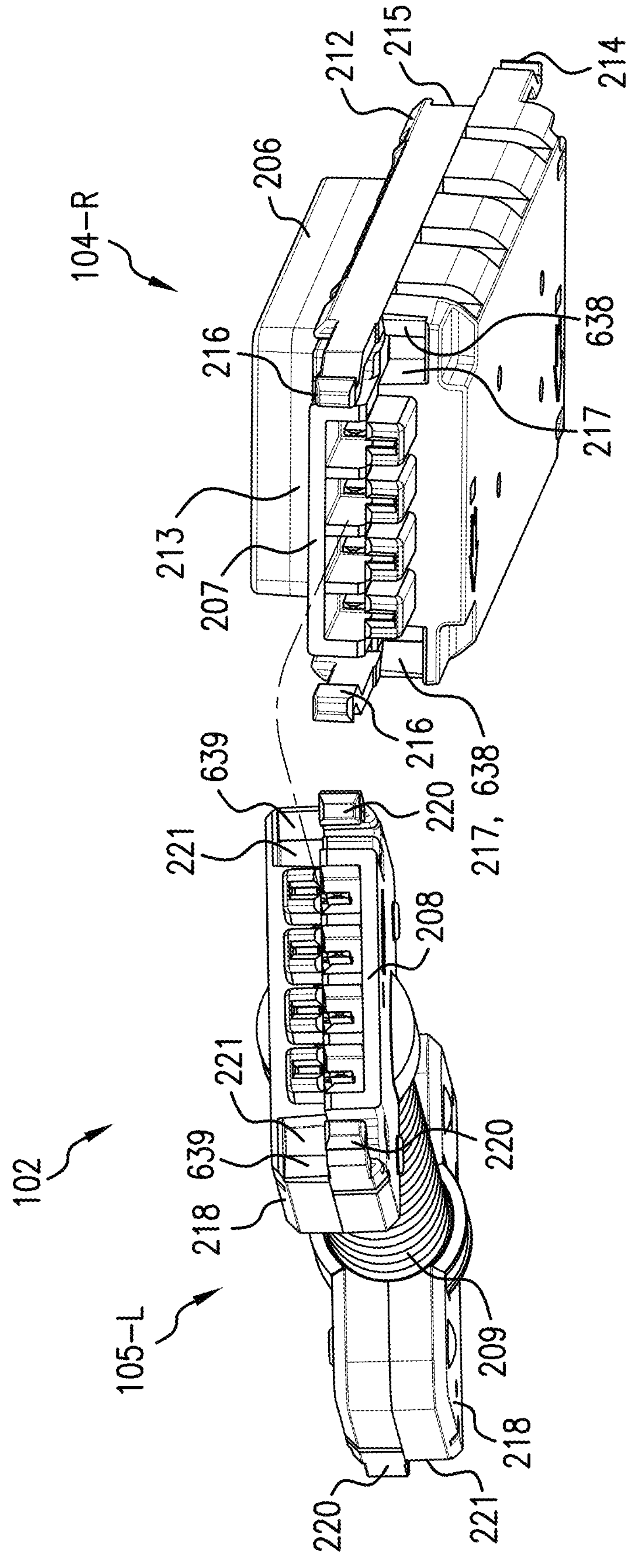
FIG. 6 is a perspective view of the electrical distribution system of FIG. 2, with portions broken away, according to an exemplary embodiment of the present invention.

Referring now to FIG. 5, there is shown another exploded side view of electrical distribution system 102, with portions broken away. More specifically, FIG. 5 shows receptacle 104-R and jumper 105-L. Regarding receptacle 104-R (and thus also receptacle 104-L), on first end 212 the pair of female latch members 215 are vertically displaced relative to the pair of male latch members 214 such that the pair of female latch members 215 are positioned above the pair of male latch members 214 (male latch members 214 are thus located vertically below female latch members 215), and on second end 213 the pair of female latch members 217 are vertically displaced relative to the pair of male latch members 216 such that the pair of female latch members 217 are positioned vertically below the pair of male latch members 216 (male latch members 216 are thus located vertically above female latch members 217). Similarly, regarding jumper 105-L (and thus also jumper 105-R), with respect to body 218 on the left end of jumper 105-L in FIG. 5 the pair of female latch members 221 are vertically displaced relative to the pair of male latch members 220 such that the pair of female latch members 221 are positioned above the pair of male latch members 220 (male latch members 220 are thus located vertically below female latch members 221), and with respect to body 218 on the right end of jumper 105-L in FIG. 5 the pair of female latch members 221 are vertically displaced relative to the pair of male latch members 220 such that the pair of female latch members 221 are positioned below the pair of male latch members 220 (male latch members 220 are thus located vertically above female latch members 217).

Further, according to an exemplary embodiment of receptacle 104-R (and thus also receptacle 104-L), body 210 includes two halves 536A, 536B (which can also be referred to as a base 536A and a cover 536B), which can be joined together in any suitable manner, such as (for example and not limitation) by way of a snap fit and/or fasteners (such as rivets). Similarly, according to an exemplary embodiment of jumper 105-L (and thus also jumper 105-R), body 218 includes two halves 537A, 537B (which can also be referred to as a base 537A and a cover 537B), which can be joined together in any suitable manner, such as (for example and not limitation) by way of a snap fit and/or fasteners (such as rivets).

According to an embodiment of the present invention, body halves 536A, 536B, 537A, 537B (as well as outlet faces 206 and any other suitable part of electrical distribution system 102) can be made of any suitable material, such as (for example and not by way of limitation) a metal and/or a polymer, and can be formed in any suitable manner, such as (for example and not by way of limitation) a molding operation, such as injection molding. Thus, according to an embodiment of the present invention, latch members 214, 215, 216, 217, 220, 221 can be formed integral—as part of an injection molding operation—with their respective body halves 536A, 536B, 537A, 537B.

Referring now to FIG. 6, there is shown a perspective view of receptacle 104-R and jumper 105-L, with mating ends of receptacle 104-R and jumper 105-L turned in toward one another. Thus, in the foreground of FIG. 6 are end 213 of receptacle 104-R and the left end (more specifically, the left-side body 218) of jumper 105-L shown in FIG. 5. Each female latch member 215, 217 of receptacle 104-R (and thus also receptacle 104-L) includes an inwardly projecting ramp 638, and each female latch member 221 of jumper 105-L (and thus also jumper 105-R) also includes an inwardly projecting ramp 639. Each ramp 638, 639 is configured for being abutted against by distal portions 323, 327 respectively as male latch members 214, 216, 220 are respectively inserted in female latch portions 215, 217, 221. As this abutment occurs, male latch members 214, 216, 220 (which are resilient) are deflected inwardly as distal portions 323, 327 slide along ramps 638, 639, respectively.

Figure 7:
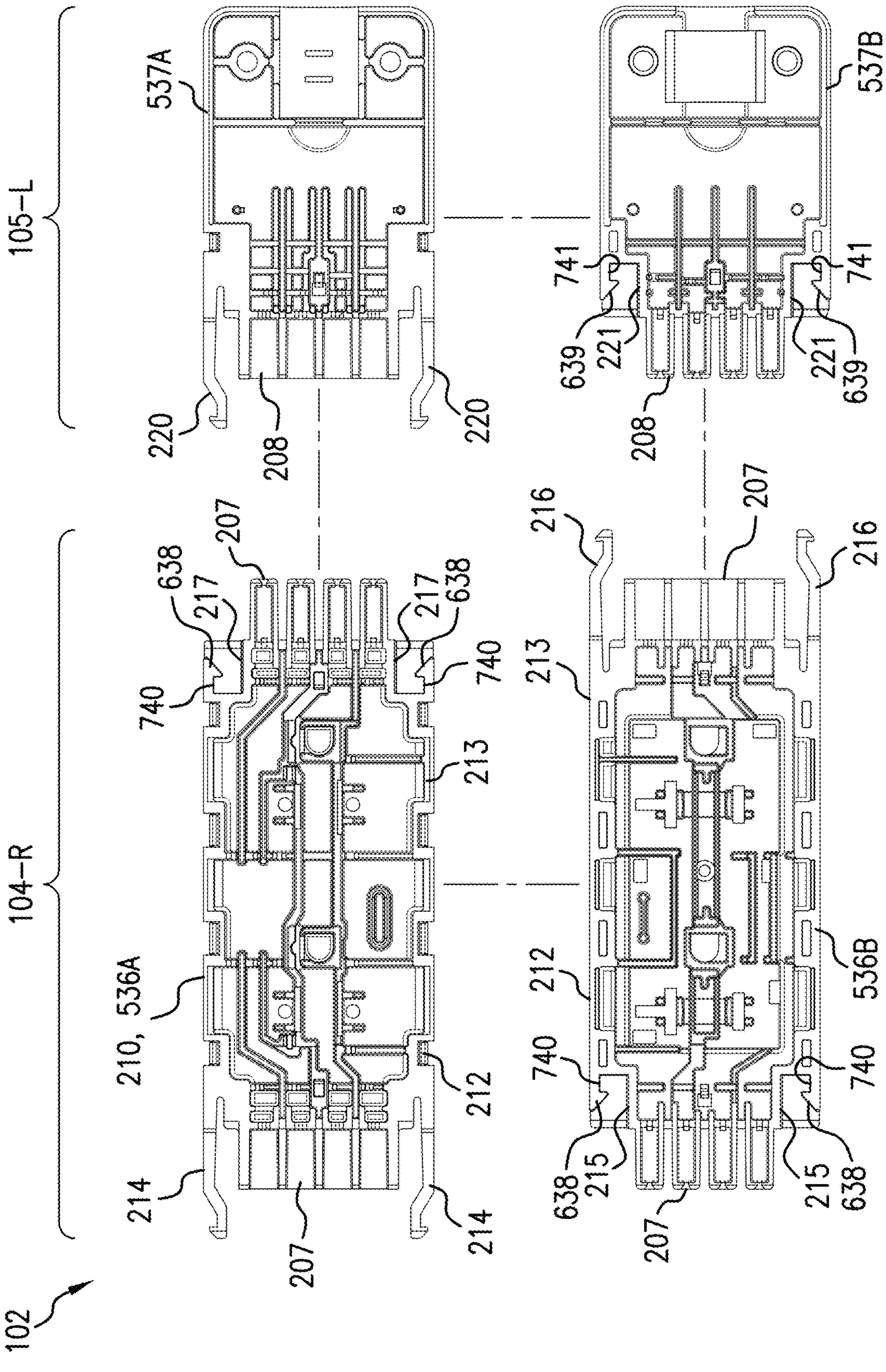
FIG. 7 shows interior side views of the electrical distribution system of FIG. 2, with portions broken away, according to an exemplary embodiment of the present invention.

Referring now to FIG. 7, there is shown interior side views of electrical distribution system 102, with portions broken away. More specifically, FIG. 7 shows interior side views of receptacle 104-R (and thus also receptacle 104-L) (with portions broken away such that much of receptacle 104-R, except for latching arrangement 211 is shown schematically) and a portion jumper 105-L (and thus also a portion of jumper 105-R), namely, the left end of jumper 105-L (the left end of jumper 104-L shown in FIG. 5). Body halves 536A, 536B of receptacle 104-R are laid open so that the interior of these body halves 536A, 536B are visible, though portions are broken away (for example, the electrical terminals of receptacle 104-R are not shown). Similarly, body halves 537A, 537B of the left body 218 of jumper 105-L are laid open so that the interior of these body halves 537A, 537B are visible, though portions are broken away (for example, the electrical terminals of jumper 105-L are not shown).

Each female latch member 215, 217 of receptacle 104-R (and thus also receptacle 104-L) further includes a recess 740, and each female latch member 221 of jumper 105-L (and thus also jumper 105-R) also includes a recess 741. Each recess 740, 741 is configured for receiving and holding therein a respective barb 325, 329 after a respective distal portion 323, 327 of respective male latch members 214, 216, 220 slide over respective ramps 638, 639 when respective male latch members 214, 216, 220 are inserted in respective female latch members 215, 217, 221.

Figure 8:
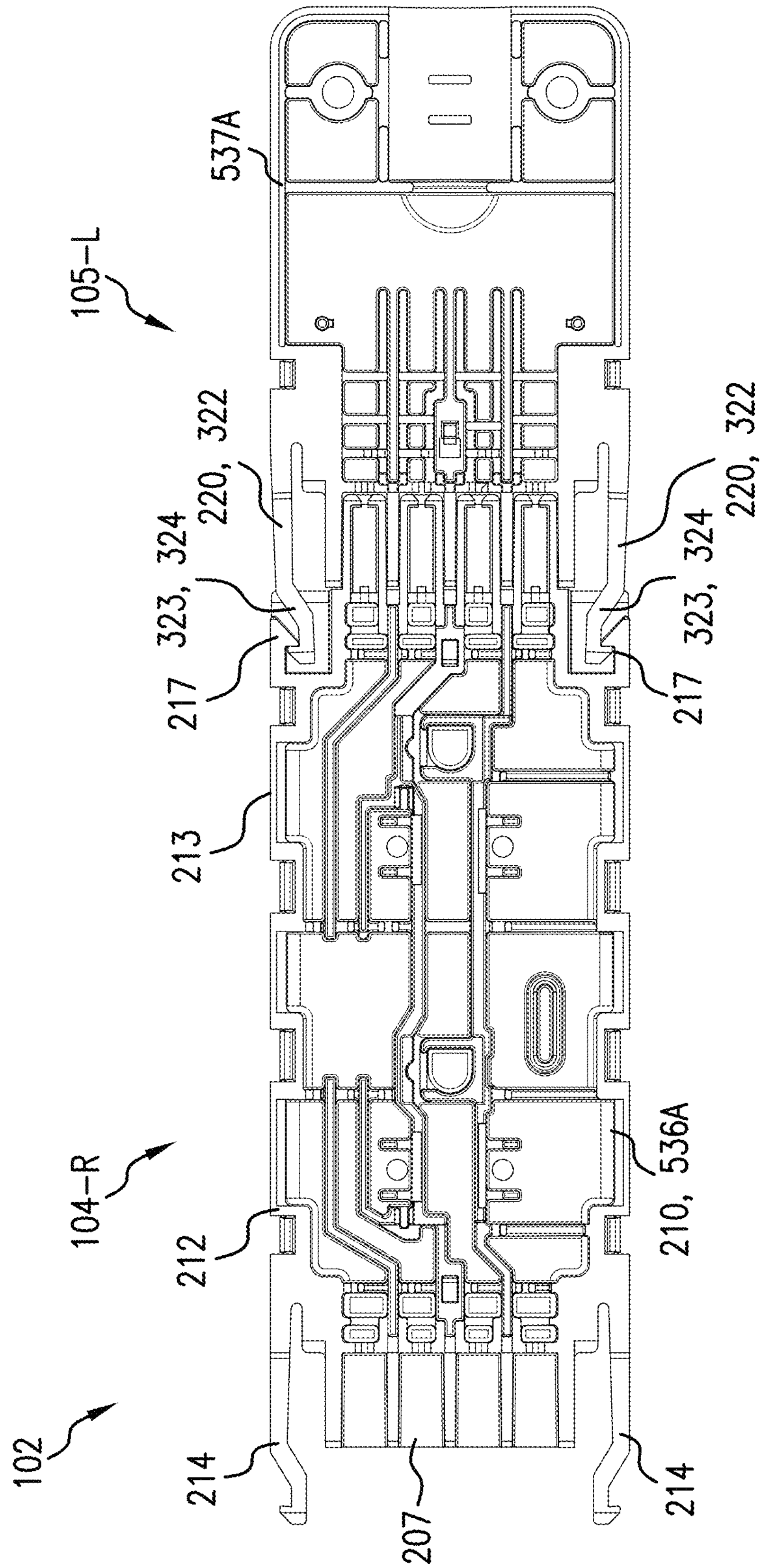
FIG. 8 shows interior side views of the electrical distribution system of FIG. 2, with portions broken away, according to an exemplary embodiment of the present invention.

Referring now to FIG. 8, there is shown a side view of electrical distribution system 102, with portions broken away. More specifically, FIG. 8 shows an interior side view of body half 536A of receptacle 104-R (and thus also receptacle 104-L) (with portions broken away such that much of receptacle 104-R, except for latching arrangement 211 is shown schematically) and also an interior side view of body half 537A of the left end of jumper 105-L. Rather than being exploded apart from one another as in FIG. 7, in FIG. 8, body halves 536A and 537A are shown connected together by way of portions of electrical connectors 207, 208 and portions of latching mechanisms 211, 219. The focus of FIG. 8 is on the connection between male latch members 220 of jumper 105-L and female latch members 217 of receptacle 104-R. FIG. 8 shows barbs 325 of male latch members 220 of jumper 105-L seated respectively in recesses 740 of female latch members 217 of receptacle 104-R. As indicated, this seating occurs after barbs 325 of male latch members 220 of jumper 105-L slide along ramps 638 of female latch members 217 of receptacle 104-R (which causes male latch members 220 to deflect inwardly toward one another), male latch members 220 snapping into place in a respective recess 740 after traversing ramps 638. Male latch members 220 can be released from recesses 740 when a user depresses male latch member 220 inwardly toward one another (such as by way of a thumb and forefinger of a user) so as to clear recesses 740, and then user can pull receptacle 104-R and jumper 105-L away from one another to complete the disengagement of receptacle 104-R and jumper 105-L relative to one another. Further, as shown in FIG. 8, when jumper 105-L is coupled with receptacle 104-R by way of latching arrangements 211, 219, cantilevered beam 326 of each male latch member 220 of jumper 105-L is positioned outside body 210 of receptacle 104-R, and hook 328 of each male latch member 220 of jumper 105-L extends respectively inside of female latch members 217 of receptacle 104-R such that barb 329 of each hook 328 of each male latch member 220 is positioned respectively inside of female latch members 217. The illustrated latching connection in FIG. 8 between male latch members 220 of jumper 105-L and female latch members 217 of receptacle 104-R using latching arrangements 211, 219 is substantially similar to any and all latching connections that can be made between any combination of receptacles and jumpers according to the present invention and thus represents any such latching connection according to the present invention (such as receptacle 104-L connected to receptacle 104-L, and jumper 105-L connected to jumper 105-R).

In use, electrical distribution system 102 can be coupled with one or more wall panels 101 to form electrical wall panel system 101. Virtually any combination of receptacles and/or jumpers can be used as parts of electrical distribution system 102. For example, receptacles 104-L, 104-R can be connected together, receptacle 104-R and jumper 105-L can be connected together, and jumpers 105-L and 105-R can be connected together. During installation, in order for outlet faces 206 of receptacles 104-L, 104-R to face in the same direction, second end 213 of receptacle 104-L is connected with first end 212 of receptacle 104-R. In so doing, electrical connectors 207 of these two ends 212, 213 of these two receptacles 104-L, 104-R are connected together, and, simultaneously, latching mechanism 211 of second end 213 of receptacle 104-L and latching mechanism 211 of first end 212 of receptacle 104-R are attached together. To attach these latching mechanisms 211 together, a user can squeeze male latch members 216 of receptacle 104-L toward one another and male latch members 214 of receptacle 104-R toward one another and insert male latch members 216 of receptacle 104-L inside female latch members 215 of receptacle 104-R and male latch members 214 of receptacle 104-R inside female latch members 217 of receptacle 104-L until respective barbs 325 seat within respective recesses 740. To uninstall, user can squeeze male latch members 216 of receptacle 104-L toward one another and male latch members 214 of receptacle 104-R toward one another until respective barbs 325 unseat from respective recesses 740 and can then pull receptacles 104-L, 104-R apart from one another. According to an alternative embodiment of the present invention, outlet faces 206 can face in opposite directions relative to one another, rather than in the same direction; to accomplish this, one of the receptacles (relative to the current position of both outlet faces 206 facing in the same direction) is pivoted 180 degrees about an axis extending perpendicular to the page of FIG. 5 and thus substantially perpendicularly through each longitudinal side of the receptacle, such that outlet faces 206 face in opposite directions relative to one another. Even in this alternative configuration, receptacles 104-L, 104-R can connect directly with one another (that is, without any extra spacer devices between receptacles 104-L, 104-R, such as an electrical distribution harness or an electrical distribution module therebetween) due to mating electrical connectors 207.

Further, (assuming outlet faces 206 face in the same direction), receptacle 104-R can be connected with the left end body 218 of jumper 105-L during installation. In so doing, electrical connector 207 of second end 213 of receptacle 104-R and electrical connector 208 of left end body 218 of jumper 105-L are connected together, and, simultaneously, latching mechanism 211 of second end 213 of receptacle 104-R and latching mechanism 219 of left end of jumper 105-L are attached together. To attach these latching mechanisms 211, 219 together, a similar process as that described above is used. That is, user can squeeze male latch members 216 of receptacle 104-R toward one another and male latch members 220 of left end of jumper 105-L toward one another and insert male latch members 216 of receptacle 104-R inside female latch members 220 of left end of jumper 105-L and male latch members 220 of left end of jumper 105-L inside female latch members 217 of receptacle 104-R until respective barbs 325, 326 seat within respective recesses 740, 741. To uninstall, user can squeeze male latch members 216 of receptacle 104-R toward one another and male latch members 220 of left end of jumper 105-L toward one another until respective barbs 325, 326 unseat from respective recesses 740, 741 and can then pull receptacle 104-R and left end of jumper 105-L apart from one another.

Further, right end of jumper 105-L can be connected with jumper 105-R during installation. In so doing, electrical connectors 208 of right end of jumper 105-L and jumper 105-R are connected together, and simultaneously, latching mechanisms 219 of right end of jumper 105-L and jumper 105-R are attached together. To attach these latching mechanisms 219 together, a similar process as that described above is used. That is, user can squeeze male latch members 220 of right end of jumper 105-L toward one another and male latch members 220 of jumper 105-R toward one another and insert male latch members 220 of right end of jumper 105-L inside female latch members 221 of jumper 105-R and male latch members 220 of jumper 105-R inside female latch members 221 of right end of jumper 105-L until respective barbs 326 seat within respective recesses 741. To uninstall, user can squeeze male latch members 220 of left end of jumper 105-L toward one another and male latch members 220 of jumper 105-R toward one another until respective barbs 326 unseat from respective recesses 741 and can then pull jumpers 105-L and 105-R apart from one another.

Advantageously, the present invention enables wall panel 101, and thus also raceway 103, to be one-inch thick.

Figure 9:
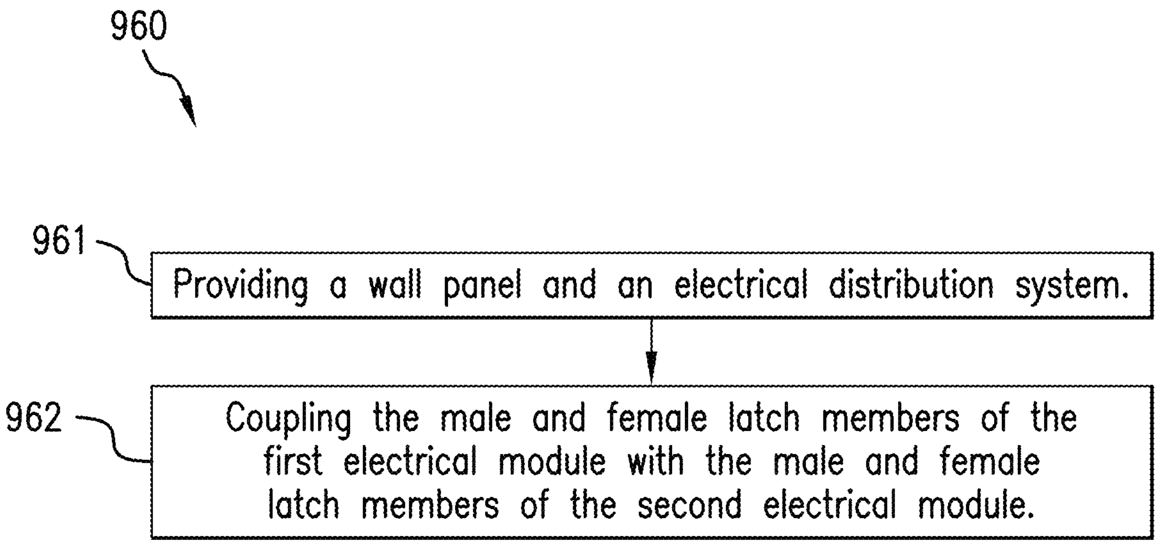
FIG. 9 is a flow diagram showing a method of using the electrified office furniture system, in accordance with an exemplary embodiment of the present invention.

Referring now to FIG. 9, there is shown a flow diagram showing a method 960 of using electrified office furniture system 1100, 100, in accordance with an exemplary embodiment of the present invention. Method 960 includes the steps of: providing 961 that electrified office furniture system 1100, 100 includes at least one piece of office furniture 1101, 101 and electrical distribution system 102 which is associated with the at least one piece of office furniture 1101, 101, the electrical distribution system 102 including first electrical module 104-L, 104-R, 105-L, 105-R and second electrical module 104-L, 104-R, 105-L, 105-R, first electrical module 104-L, 104-R, 105-L, 105-R including a first electrical module latching arrangement 211, 219 which includes a first pair of female latch members 215, 217, 221 and a first pair of male latch members 214, 216, 220, second electrical module 104-L, 104-R, 105-L, 105-R including a second electrical module latching arrangement 211, 219 which includes a first pair of female latch members 215, 217, 221 and a first pair of male latch members 214, 216, 220; and coupling 962, selectively and releasably, the first pair of female latch members 215, 217, 221 of the first electrical module latching arrangement 211, 219 and the first pair of male latch members 214, 216, 220 of the first electrical module latching arrangement 211, 219 with the first pair of male latch members 214, 216, 220 of the second electrical module latching arrangement 211, 219 and the first pair of female latch members 215, 217, 221 of the second electrical module latching arrangement 211, 219 respectively. First electrical module 104-L, 104-R, 105-L, 105-R can be an electrical receptacle 104-L, 104-R or a jumper device 105-L, 105-R, and the second electrical module 104-L, 104-R, 105-L, 105-R is an electrical receptacle 104-L, 104-R or a jumper device 105-L, 105-R. The first pair of female latch members 215, 217, 221 of the first electrical module latching arrangement 211, 219 can be vertically displaced relative to the first pair of male latch members 214, 216, 220 of the first electrical module latching arrangement 211, 219, and the first pair of female latch members 215, 217, 221 of the second electrical module latching arrangement 211, 219 are vertically displaced relative to the first pair of male latch members 214, 216, 220 of the second electrical module latching arrangement 211, 219. The first electrical module 104-L, 104-R, 105-L, 105-R includes a first electrical module body 210, 218 which defines the first pair of female latch members 215, 217, 221 of the first electrical module latching arrangement 211, 219, each respective one of the first pair of male latch members 214, 216, 220 of the first electrical module latching arrangement 211, 219 including a proximal portion 322, 326 extending from the first electrical module body 210, 218 as a cantilevered beam 322, 326 and a distal portion 323, 327 extending from the proximal portion 322, 326 as a hook 324, 328 which includes a barb 325, 329, wherein the second electrical module 104-L, 104-R, 105-L, 105-R includes a second electrical module body 210, 218 which defines the first pair of female latch members 215, 217, 221 of the second electrical module latching arrangement 211, 219, wherein, when the first electrical module 104-L, 104-R, 105-L, 105-R is coupled with the second electrical module 104-L, 104-R, 105-L, 105-R by way of the first electrical module latching arrangement 211, 219 and the second electrical module latching arrangement 211, 219, the cantilevered beam 322, 326 of each respective one of the first pair of male latch members 214, 216, 220 of the first electrical module latching arrangement 211, 219 is positioned outside of the second electrical module body 210, 218 and the hook 324, 328 of each respective one of the first pair of male latch members 214, 216, 220 of the first electrical module latching arrangement 211, 219 extends inside of the first pair of female latch members 215, 217, 221 of the second electrical module latching arrangement 211, 219 such that the barb 325, 329 of each hook 324, 328 of each respective one of the first pair of male latch members 214, 216, 220 of the first electrical module latching arrangement 211, 219 is positioned inside of the first pair of female latch members 215, 217, 221 of the second electrical module latching arrangement 211, 219. The hook can include a first leg 430, 432 attached to the cantilevered beam 322, 326, a second leg 431, 433 attached to the first leg 430, 432, and the barb 325, 329 attached to the second leg 431, 433, the first leg 430, 432 forming an obtuse angle 434, 435 with the cantilevered beam 322, 326 and thereby offsetting the first leg 430, 432 inwardly relative to the cantilevered beam 322, 326, the second leg 431, 433 being parallel to the cantilevered beam 322, 326. The first electrical module 104-L, 104-R, 105-L, 105-R is a receptacle 104-L, 104-R which includes a first end 212 and a second end 213, the first end 212 including the first pair of female latch members 215 and the first pair of male latch members 214, the first electrical module latching arrangement 211 further including a second pair of female latch members 217 and a second pair of male latch members 216, the second end 213 including the second pair of female latch members 217 and the second pair of male latch members 216, wherein, in a side view of the receptacle 104-L, 104-R, the first pair of male latch members 214 are located vertically below the first pair of female latch members 215, and the second pair of male latch members 216 are located vertically above the second pair of female latch members 217. The at least one piece of office furniture 1101, 101 can include an elongate distribution arrangement 1103, 103, the electrical distribution system 102 being associated with the elongate distribution arrangement 1103, 103, the first electrical module 104-L, 104-R, 105-L, 105-R and the second electrical module 104-L, 104-R, 105-L, 105-R each being positioned within the elongate distribution arrangement 1103, 103, each said elongate distribution arrangement 1103, 103 including: a beltline raceway 1103 in an office wall panel 1101; a bottom raceway 103 in an office wall panel 101; a distribution channel 1103 formed in a desk 1101 or table 1101; or a distribution channel 1103 attached to the bottom of a desk 1101 or table 1101.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrified office furniture system, comprising:

at least one piece of office furniture; and an electrical distribution system associated with the at least one piece of office furniture, the electrical distribution system including:

a first electrical module including a first electrical module latching arrangement which includes a first pair of female latch members and a first pair of male latch members; and a second electrical module including a second electrical module latching arrangement which includes a first pair of female latch members and a first pair of male latch members, the first pair of female latch members of the first electrical module latching arrangement and the first pair of male latch members of the first electrical module latching arrangement being selectively and releasably coupled with the first pair of male latch members of the second electrical module latching arrangement and the first pair of female latch members of the second electrical module latching arrangement respectively.

2. The electrified office furniture system according to claim 1, wherein the first electrical module is an electrical receptacle or a jumper device, and the second electrical module is an electrical receptacle or a jumper device.

3. The electrified office furniture system according to claim 2, wherein the first pair of female latch members of the first electrical module latching arrangement are vertically displaced relative to the first pair of male latch members of the first electrical module latching arrangement, and the first pair of female latch members of the second electrical module latching arrangement are vertically displaced relative to the first pair of male latch members of the second electrical module latching arrangement.

4. The electrified office furniture system according to claim 3, wherein the first electrical module includes a first electrical module body which defines the first pair of female latch members of the first electrical module latching arrangement, each respective one of the first pair of male latch members of the first electrical module latching arrangement including a proximal portion extending from the first electrical module body as a cantilevered beam and a distal portion extending from the proximal portion as a hook which includes a barb, wherein the second electrical module includes a second electrical module body which defines the first pair of female latch members of the second electrical module latching arrangement, wherein, when the first electrical module is coupled with the second electrical module by way of the first electrical module latching arrangement and the second electrical module latching arrangement, the cantilevered beam of each respective one of the first pair of male latch members of the first electrical module latching arrangement is positioned outside of the second electrical module body and the hook of each respective one of the first pair of male latch members of the first electrical module latching arrangement extends inside of the first pair of female latch members of the second electrical module latching arrangement such that the barb of each hook of each respective one of the first pair of male latch members of the first electrical module latching arrangement is positioned inside of the first pair of female latch members of the second electrical module latching arrangement.

5. The electrified office furniture system according to claim 4, wherein the hook includes a first leg attached to the cantilevered beam, a second leg attached to the first leg, and the barb attached to the second leg, the first leg forming an obtuse angle with the cantilevered beam and thereby offsetting the first leg inwardly relative to the cantilevered beam, the second leg being parallel to the cantilevered beam.

6. The electrified office furniture system according to claim 5, wherein the first electrical module is a receptacle which includes a first end and a second end, the first end including the first pair of female latch members and the first pair of male latch members, the first electrical module latching arrangement further including a second pair of female latch members and a second pair of male latch members, the second end including the second pair of female latch members and the second pair of male latch members, wherein, in a side view of the receptacle, the first pair of male latch members are located vertically below the first pair of female latch members, and the second pair of male latch members are located vertically above the second pair of female latch members.

7. The electrified office furniture system of claim 1, wherein the at least one piece of office furniture includes an elongate distribution arrangement, the electrical distribution system being associated with the elongate distribution arrangement, the first electrical module and the second electrical module each being positioned within the elongate distribution arrangement, each said elongate distribution arrangement comprising one of:

a beltline raceway in an office wall panel;

a bottom raceway in an office wall panel;

a distribution channel formed in a desk or table; and a distribution channel attached to the bottom of a desk or table.

8. An electrical distribution system for an electrified office furniture system, the electrified office furniture system including at least one piece of office furniture, the electrical distribution system being associated with the at least one piece of office furniture, the electrical distribution system comprising:

a first electrical module including a first electrical module latching arrangement which includes a first pair of female latch members and a first pair of male latch member, the first pair of female latch members of the first electrical module latching arrangement and the first pair of male latch members of the first electrical module latching arrangement being configured for being selectively and releasably coupled with a first pair of male latch members of a second electrical module latching arrangement of a second electrical module and a first pair of female latch members of the second electrical module latching arrangement respectively.

9. The electrical distribution system according to claim 8, wherein the electrical distribution system includes the second electrical module which includes the second electrical module latching arrangement which includes the first pair of female latch members of the second electrical module latching arrangement and the first pair of male latch members of the second electrical module latching arrangement, the first pair of female latch members of the first electrical module latching arrangement and the first pair of male latch members of the first electrical module latching arrangement being selectively and releasably coupled with the first pair of male latch members of the second electrical module latching arrangement and the first pair of female latch members of the second electrical module latching arrangement respectively, wherein the first electrical module is an electrical receptacle or a jumper device, and the second electrical module is an electrical receptacle or a jumper device.

10. The electrical distribution system according to claim 9, wherein the first pair of female latch members of the first electrical module latching arrangement are vertically displaced relative to the first pair of male latch members of the first electrical module latching arrangement, and the first pair of female latch members of the second electrical module latching arrangement are vertically displaced relative to the first pair of male latch members of the second electrical module latching arrangement.

11. The electrical distribution system according to claim 10, wherein the first electrical module includes a first electrical module body which defines the first pair of female latch members of the first electrical module latching arrangement, each respective one of the first pair of male latch members of the first electrical module latching arrangement including a proximal portion extending from the first electrical module body as a cantilevered beam and a distal portion extending from the proximal portion as a hook which includes a barb, wherein the second electrical module includes a second electrical module body which defines the first pair of female latch members of the second electrical module latching arrangement, wherein, when the first electrical module is coupled with the second electrical module by way of the first electrical module latching arrangement and the second electrical module latching arrangement, the cantilevered beam of each respective one of the first pair of male latch members of the first electrical module latching arrangement is positioned outside of the second electrical module body and the hook of each respective one of the first pair of male latch members of the first electrical module latching arrangement extends inside of the first pair of female latch members of the second electrical module latching arrangement such that the barb of each hook of each respective one of the first pair of male latch members of the first electrical module latching arrangement is positioned inside of the first pair of female latch members of the second electrical module latching arrangement.

12. The electrical distribution system according to claim 11, wherein the hook includes a first leg attached to the cantilevered beam, a second leg attached to the first leg, and the barb attached to the second leg, the first leg forming an obtuse angle with the cantilevered beam and thereby offsetting the first leg inwardly relative to the cantilevered beam, the second leg being parallel to the cantilevered beam.

13. The electrical distribution system according to claim 12, wherein the first electrical module is a receptacle which includes a first end and a second end, the first end including the first pair of female latch members and the first pair of male latch members, the first electrical module latching arrangement further including a second pair of female latch members and a second pair of male latch members, the second end including the second pair of female latch members and the second pair of male latch members, wherein, in a side view of the receptacle, the first pair of male latch members are located vertically below the first pair of female latch members, and the second pair of male latch members are located vertically above the second pair of female latch members.

14. A method of using an electrified office furniture system, the method comprising the steps of:

providing that the electrified office furniture system includes at least one piece of office furniture and an electrical distribution system which is associated with the at least one piece of office furniture, the electrical distribution system including a first electrical module and a second electrical module, the first electrical module including a first electrical module latching arrangement which includes a first pair of female latch members and a first pair of male latch members, the second electrical module including a second electrical module latching arrangement which includes a first pair of female latch members and a first pair of male latch members; and coupling, selectively and releasably, the first pair of female latch members of the first electrical module latching arrangement and the first pair of male latch members of the first electrical module latching arrangement with the first pair of male latch members of the second electrical module latching arrangement and the first pair of female latch members of the second electrical module latching arrangement respectively.

15. The method according to claim 14, wherein the first electrical module is an electrical receptacle or a jumper device, and the second electrical module is an electrical receptacle or a jumper device.

16. The method according to claim 15, wherein the first pair of female latch members of the first electrical module latching arrangement are vertically displaced relative to the first pair of male latch members of the first electrical module latching arrangement, and the first pair of female latch members of the second electrical module latching arrangement are vertically displaced relative to the first pair of male latch members of the second electrical module latching arrangement.

17. The method according to claim 16, wherein the first electrical module includes a first electrical module body which defines the first pair of female latch members of the first electrical module latching arrangement, each respective one of the first pair of male latch members of the first electrical module latching arrangement including a proximal portion extending from the first electrical module body as a cantilevered beam and a distal portion extending from the proximal portion as a hook which includes a barb, wherein the second electrical module includes a second electrical module body which defines the first pair of female latch members of the second electrical module latching arrangement, wherein, when the first electrical module is coupled with the second electrical module by way of the first electrical module latching arrangement and the second electrical module latching arrangement, the cantilevered beam of each respective one of the first pair of male latch members of the first electrical module latching arrangement is positioned outside of the second electrical module body and the hook of each respective one of the first pair of male latch members of the first electrical module latching arrangement extends inside of the first pair of female latch members of the second electrical module latching arrangement such that the barb of each hook of each respective one of the first pair of male latch members of the first electrical module latching arrangement is positioned inside of the first pair of female latch members of the second electrical module latching arrangement.

18. The method according to claim 17, wherein the hook includes a first leg attached to the cantilevered beam, a second leg attached to the first leg, and the barb attached to the second leg, the first leg forming an obtuse angle with the cantilevered beam and thereby offsetting the first leg inwardly relative to the cantilevered beam, the second leg being parallel to the cantilevered beam.

19. The method according to claim 18, wherein the first electrical module is a receptacle which includes a first end and a second end, the first end including the first pair of female latch members and the first pair of male latch members, the first electrical module latching arrangement further including a second pair of female latch members and a second pair of male latch members, the second end including the second pair of female latch members and the second pair of male latch members, wherein, in a side view of the receptacle, the first pair of male latch members are located vertically below the first pair of female latch members, and the second pair of male latch members are located vertically above the second pair of female latch members.

20. The method of claim 14, wherein the at least one piece of office furniture includes an elongate distribution arrangement, the electrical distribution system being associated with the elongate distribution arrangement, the first electrical module and the second electrical module each being positioned within the elongate distribution arrangement, each said elongate distribution arrangement comprising one of:

a beltline raceway in an office wall panel;

a bottom raceway in an office wall panel;

a distribution channel formed in a desk or table; and a distribution channel attached to the bottom of a desk or table.

* * * * *